United States Patent [19]

Kadowaki

[11] Patent Number: 5,493,591
[45] Date of Patent: Feb. 20, 1996

[54] INTERNAL PUMP FOR NUCLEAR REACTORS

[75] Inventor: Isamu Kadowaki, Chiyoda, Japan

[73] Assignee: Hitachi, Ltd., Tokyo, Japan

[21] Appl. No.: 327,867

[22] Filed: Oct. 24, 1994

[51] Int. Cl.⁶ .................................................. G21C 15/243
[52] U.S. Cl. ........................... 376/402; 376/277; 417/372
[58] Field of Search ..................... 376/277, 361, 376/379, 391, 402, 406; 417/366, 372, 423.6, 368; 74/572; 415/148, 149.1, 149.2, 150, 201

[56] References Cited

U.S. PATENT DOCUMENTS

| | | | |
|---|---|---|---|
| 3,467,578 | 9/1969 | Kornbichler et al. | 376/402 |
| 3,706,513 | 12/1972 | Holz et al. | 376/402 |
| 3,918,830 | 11/1975 | Schneider | 74/572 |
| 3,950,220 | 4/1976 | Holz | 376/391 |

FOREIGN PATENT DOCUMENTS 58-211595  12/1983  Japan.

*Primary Examiner*—Daniel D. Wasil
*Attorney, Agent, or Firm*—Evenson McKeown Edwards & Lenahan

[57] ABSTRACT

A nuclear internal pump is disclosed in which a flywheel and a thrust disc acting as an auxiliary impeller are fixed on a motor shaft. Fixed orifices X and Y are formed respectively between outer circumference section at larger and smaller diameter sides of the thrust disc and larger and smaller diameter rings disposed to face the outer circumference section respectively, thereby to form a pressurized chamber between the two fixed orifices X and Y. The thrust disc is equipped with an axial thrust reducing device which has two sets of channels for circulating motor cooling water and for boosting the pressure in the pressurized chamber.

6 Claims, 4 Drawing Sheets

5,493,591

INTERNAL PUMP FOR NUCLEAR REACTORS

BACKGROUND OF THE INVENTION

The present invention relates to an internal pump for a nuclear reactor and, more particularly, to a wet motor type reactor internal pump which is disposed in the bottom of a reactor pressure vessel for circulating the reactor coolant. The present invention is especially applied to a rotary portion floating device for the reactor internal pump which has its rotor weight increased by using a flywheel at its rotary portion.

In a known reactor internal pump of the prior art, as disclosed in Japanese Published Patent Application No. 211595/1983, there is fixed on the shaft in a motor chamber a thrust disc acting as an auxiliary impeller. A fixed orifice is formed between the outer circumference of the thrust disc and an external ring facing the same whereas a variable orifice is formed between the inner lower face of the thrust disc and an internal ring facing the same, to define a pressure regulating chamber between the two orifices.

In the prior art technology described above, the upward thrust is balanced by finely adjusting the pressure in the pressure regulating chamber through the variable orifice. Since the reactor internal pump of the prior art has no flywheel, it is not concerned with the substantial weight increase due to the flywheels.

Reactor internal pumps may be required to have a high inertia by the system used in a plant. For this high inertia, a flywheel is added to the motor unit so that the weight of the rotary portion is accordingly increased. This increase of weight leads to an increase in the load upon the lower thrust bearing, thus raising a problem that the bearing lifetime is adversely affected.

SUMMARY OF TEE INVENTION

An object of the present invention is to provide a reactor internal pump which is equipped with rotary portion floating means for lightening the load upon the lower thrust bearing during operational running so as to prolong the lifetime of the thrust bearing without adding any complicated and costly peripheral devices.

In order to achieve the above-specified object, the present invention contemplates a reactor internal pump assembly comprising: a pump unit disposed in a pressure vessel; and a motor unit disposed coaxially with the pump unit in a motor casing joined to the pressure vessel, which motor unit includes a motor, a flywheel fixed on the shaft of the motor at one side, and a thrust disc fixed on the motor shaft at the other side and acting as an auxiliary impeller; wherein the thrust disc has a plurality of coaxial cylinder portions of different external diameters for forming respective fixed orifices between the outer circumference of the respective cylinder portions and a larger ring and a smaller ring disposed therearound to thereby define a pressurized chamber between the fixed orifices at the large and smaller diameter sides.

In especially preferred embodiments, the pressurized chamber is formed below the bulging cylinder large diameter portion of the thrust disc. In addition, the thrust disc further has two sets of channels for circulating motor cooling water and for boosting the pressure in the pressurized chamber, and the pressurized chamber pressure boosting channels have their suction ports positioned at the discharge side of the motor cooling water circulating channels.

According to preferred embodiments of the present invention, the pressurized chamber is formed by both the thrust disc acting as an auxiliary impeller fixed on the lower portion of the motor rotary portion of the reactor internal pump and the orifice formed in the stationary portion facing the outer circumference of the former. The auxiliary impeller has its outlet leading to the pressurized chamber and its inlet leading to the fluid support portion below the auxiliary impeller. The thrust disc is connected to the rotary portion of the pump. Moreover, the thrust disc has the function of a piston so that it is lifted upward as the pressure in the pressurized chamber rises, to thereby float the rotary portion.

When the reactor internal pump is operated, the auxiliary impeller is rotated by the motor. The fluid supplied from the suction chamber below the auxiliary impeller is pressurized by the auxiliary impeller to reach the pressurized chamber. Then, the liquid flows upward and downward of the thrust disc through the clearance between the thrust disc and the orifice of the stationary portion. At this time, the thrust disc is lifted upward by the pressure difference between the inside and outside of the pressurized chamber and the difference between the pressurizing areas of the orifice portions. Then, the thrust disc floats the pump rotary portion because these two are connected to each other.

Other objects, advantages and novel features of the present invention will become apparent from the following detailed description of the invention when considered in conjunction with the accompanying drawings.

DESCRIPTION OF THE PREFERRED EMBODIMENTS

The present invention will be described in the following in connection with the illustrated embodiments.

Figure 1:
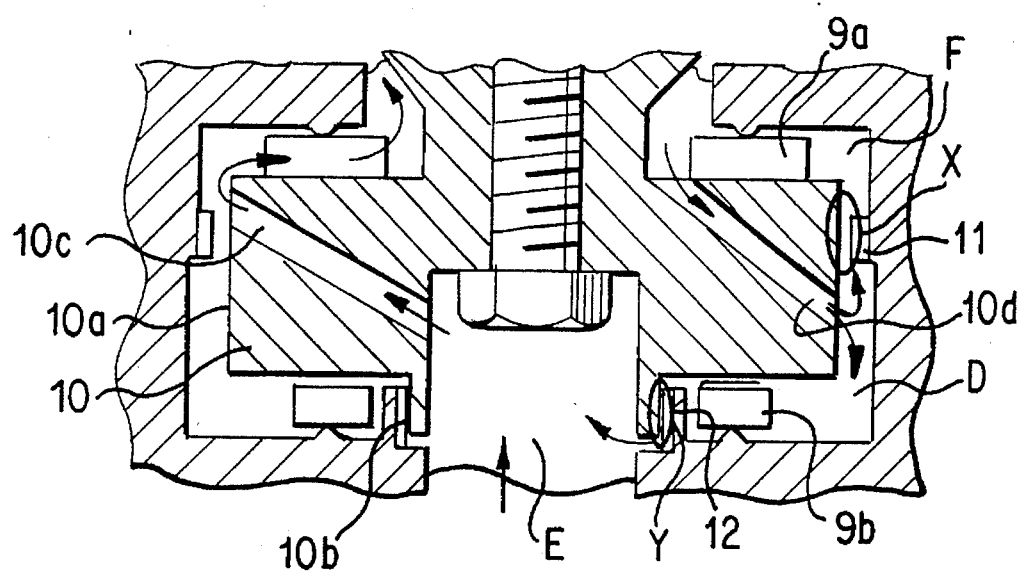
FIG. 1 is a schematic sectional view showing a thrust reducing device for a reactor internal pump according to one embodiment of the present invention.
Figure 2:
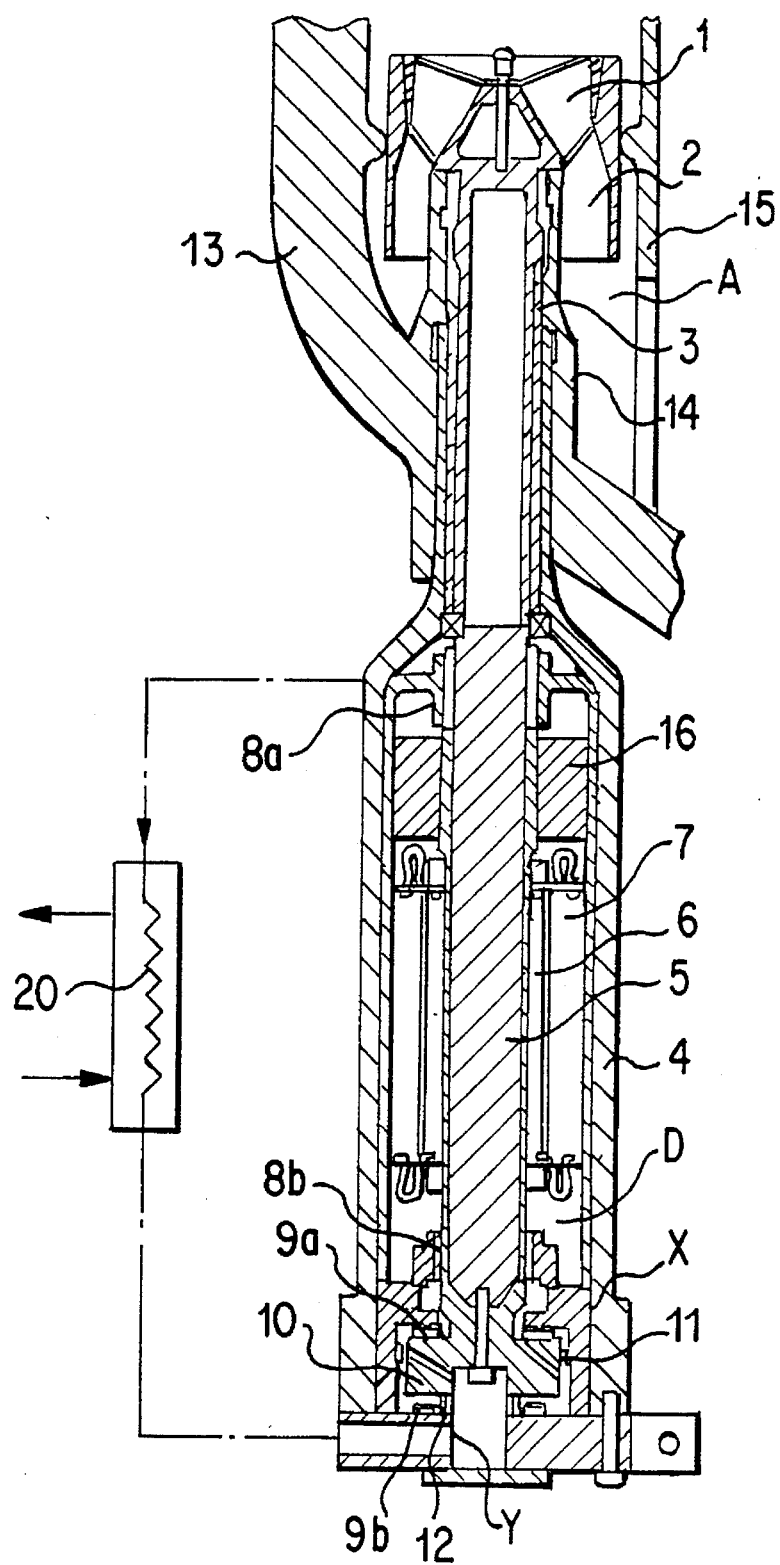
FIG. 2 is a schematic longitudinal sectional view showing a reactor internal pump equipped with the thrust reducing device of FIG. 1.

FIG. 1 is a sectional view showing a thrust reducing device for a reactor internal pump according to one embodiment of the present invention. FIG. 2 is a longitudinal sectional view showing the reactor internal pump equipped with the thrust reducing device of FIG. 1.

The reactor internal pump, as shown in FIG. 2, is a submergible pump which comprises a pump unit and a motor unit. The pump unit is similar to prior art pump units at the type referred to above, is constructed such that a main impeller 1 is fixed on the leading end of a shaft 5 extending through a boss portion 14 formed on a reactor pressure vessel 13. A diffuser 2, and a sleeve 3 supporting the diffuser are accommodated in a pump chamber A which is formed between the pressure vessel 13 and a shroud support plate 15 disposed in the pressure vessel 13.

The motor unit is accommodated in a motor chamber B of a motor casing 4 joined to the boss portion 14. The motor unit includes a rotor 6, which is fixed on the shaft 5 acting as a motor shaft and supported by radial bearings $8a$ and $8b$ and upper and lower thrust bearings $9a$ and $9b$, a flywheel 16 fixed on the upper portion of the motor, a stator motor fixed on the inner wall of the motor casing 4, and a thrust disc 10 fixed on the lower end of the shaft 5 and acting as an auxiliary impeller for circulating the motor cooling water.

The details of the construction of the thrust reducing device including the thrust disc 10 acting as the auxiliary impeller is shown in FIG. 1.

In FIG. 1, the thrust disc 10 is composed of a plurality of coaxial cylinder portions having different external diameters. Reference numeral $10a$ designates the outer circumference of a bulging cylinder portion having a larger diameter, and numeral $10b$ designates the outer circumference of a constricted cylinder portion having a smaller diameter. The upper thrust bearing $9a$ is positioned above the upper portion (i.e., the bulging cylinder portion) of the thrust disc 10, and the lower thrust bearing $9b$ is positioned below the lower portion (i.e., the constricted cylinder portion) of the thrust disc 10.

Designated at reference numeral 11 is an upper ring having a larger diameter, which is fitted in the inner wall of the motor casing 4 while facing the larger outer circumference $10a$. Designated at numeral 12 is a lower ring having a smaller diameter, which is fitted on the inner wall of the motor casing 4 while facing the smaller outer circumference $10b$. Designated at reference letter X is a fixed orifice which is located at the larger diameter side and formed by the larger outer circumference $10a$ and the upper ring 11. Designated at letter Y is a fixed orifice which is located at the smaller diameter side and formed by the smaller outer circumference $10b$ and the lower ring 12. Designated at letter D is a pressurized chamber which is defined between the two fixed orifices X and Y at the larger and smaller diameter sides. This pressurized chamber D is mainly located below the bulging cylinder portion of the thrust disc 10. Letter E designates a suction chamber below the thrust disc 10, and letter F designates an upper thrust bearing chamber.

Designated at reference numeral $10c$ is a channel which is formed in the thrust disc 10 for circulating the motor cooling water. This channel $10c$ provides communication between the suction chamber E and the upper thrust bearing chamber F. Designated at numeral $10d$ is a channel which is also formed in the thrust disc 10 but for boosting the pressure in the pressurized chamber D. This channel $10d$ provides communication between the upper thrust bearing chamber F and the pressurized chamber D. Only one each of channel $10c$ and $10d$ are shown in the sectional view of FIG. 1, it being understood that a plurality of equiangularly spaced channels are provided around the circumference of the thrust disc 10. In short, the thrust disc 10 is equipped with two kinds of channels, i.e., four channels $10c$ for circulating the motor cooling eater and four channels $10d$ for boosting the pressure in the pressurized chamber D, each of which has a diameter of 15–30 mm and is inclined at an angle of 0–45 degrees with respect to the horizontal. The pressure boosting channels $10d$ have their suction ports positioned at the discharge side of the water circulating channels $10c$.

Following is a description of the operation of the reactor internal pump illustrated in FIG. 1 and 2.

When the internal pump is operated, the fluid is thrown of forced radially outwardly by a centrifugal force through the channels $10c$ of the thrust disc 10 from the suction chamber E to the upper thrust bearing chamber F, as shown in FIG. 1. Through the channels $10d$, the fluid is also thrown or forced radially outward by centrifugal force from the upper thrust bearing chamber F to the pressurized chamber D. Most of the fluid having flown out of the channels $10c$ into the upper thrust bearing chamber F runs upward through the upper thrust bearing $9a$ and the radial bearing $8b$ to cool the rotor 6 and the stator 7, as shown in FIG. 2. After this, the fluid flows through the flywheel 16 and the radial bearing $8a$ into a heat exchanger 20 located outside of the reactor internal pump, until it returns to the inside of the suction chamber E of the thrust disc 10.

On the other hand, a portion of the fluid having flown out of the channels $10d$ into the pressurized chamber D runs through the fixed orifice X, which is formed between the upper ring 11 and the larger outer circumference $10a$ of the thrust disc 10, and then through the lower thrust bearing $9b$. After this, the fluid flows through the fixed orifice Y, which is formed between the lower ring 12 and the smaller outer circumference $10b$ of the thrust disc 10, into the suction chamber E in the thrust disc 10.

Since the heat exchanger 20 has its flow resistance set to a far lower level than those of the fixed orifices X and Y, the pressures in the upper thrust bearing chamber F and the thrust disc suction chamber E are substantially equalized. In the aforementioned running mode, therefore, the pressurized chamber D always has a higher pressure than those of the suction chamber E an the upper thrust bearing chamber F to establish a pressure difference.

As a result, the thrust disc 10 is lifted toward the main impeller 1 by the lifting force, which is generated by the aforementioned pressure difference and the difference between the pressure receiving areas coming from the size difference between the fixed orifices X and Y. The thrust disc 10 is connected to the rotary portions including the main impeller 1, the shaft 5 and the rotor 6 so that the rotary portions are floated upwardly by the aforementioned lifting force to reduce the load upon the lower thrust bearing $9b$.

Thus, according to the present embodiment, the load to be borne by the lower thrust bearing at the pump running time can be lightened without any complicated peripheral device with consequent prolongation of the lifetime of the thrust bearings.

Figure 3:
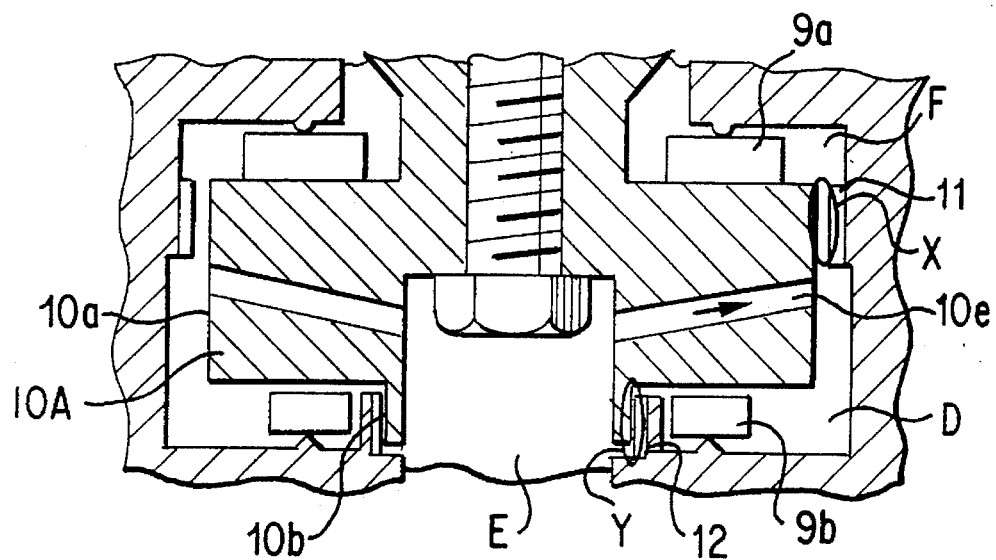
FIG. 3 is a schematic sectional view showing a thrust reducing device for a reactor internal pump according to another embodiment of the present invention.

FIG. 3 is a sectional view showing a thrust reducing device for a reactor internal pump according to another embodiment of the present invention. The description of the portions designated with the same reference numerals as those of FIG. 1 is omitted because they are equivalent to those of the foregoing embodiment.

The FIG. 3 embodiment differs from the one shown in FIG. 1 in that a thrust disc 10A is formed with one kind of channel $10e$. These channels $10e$ provide communication between the suction chamber E and the pressurized chamber D.

When the reactor internal pump is operated, the fluid is thrown by the centrifugal force from the suction chamber E to the pressurized chamber D through the channels $10e$ formed in the thrust disc 10A. The fluid thus having its pressure boosted flows partly through the fixed orifice X into the upper thrust bearing chamber F and partly through the fixed orifice Y into the suction chamber E. If, at this time, the fixed orifice X is given a higher flow resistance than that of the fixed orifice Y, most of the fluid emanating from the pressurized chamber D can be introduced into the upper thrust bearing chamber F. The operations downstream of the upper thrust bearing chamber F are identical to those of the foregoing Embodiment 1. Moreover, the lifting action of the thrust disc 10A and the floating action of the rotary portions are also identical to those of the foregoing Embodiment of FIG. 1.

Figure 4:
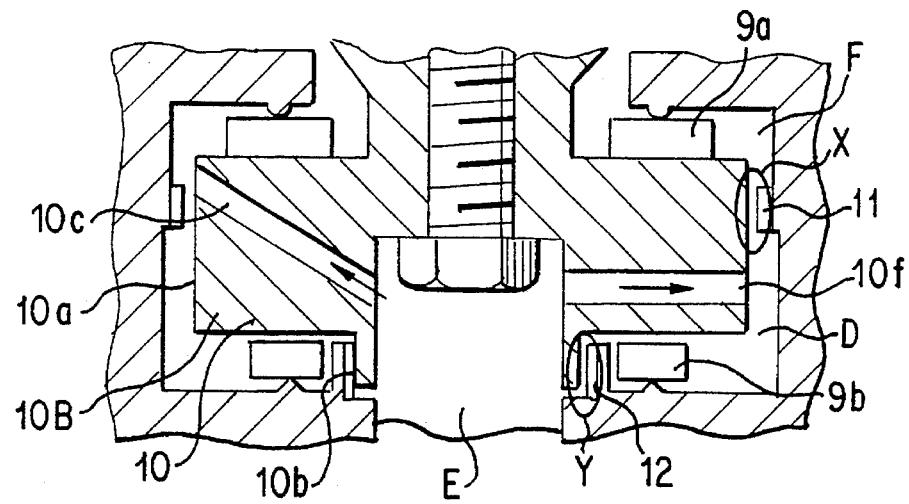
FIG. 4 is a schematic sectional view showing a thrust reducing device for a reactor internal pump according to still another embodiment of the present invention.

FIG. 4 is a sectional view showing a thrust reducing device for a reactor internal pump according to still another embodiment of the present invention. The description of the portions designated at the same reference numerals as those of FIG. 1 is omitted because they are equivalent to shoe of the foregoing embodiment.

The embodiment shown in FIG. 4 differs from the foregoing embodiment shown in FIG. 1 in that a thrust disc 10B is formed with two kinds of channels 10c and 10f having their suction ports and discharge ports arranged in different positions. This embodiment of FIG. 4 is applied to the case in which the upper thrust bearing chamber F cannot be arranged with a suction port. The channels 10c are identical to the foregoing channels 10c shown in FIG. 1. On the other hand, the channels 10f provide generally horizontal communication between the suction chamber E and the pressurized chamber D.

When the reactor internal pump is operated, the channels 10c have an action identical to that of the foregoing embodiment of FIG. 1. On the other hand, the channels 10f act as an auxiliary impeller having hydraulic characteristics identical to those of the channels 10c. However, the flow rates are restricted by the fixed orifices X and Y so that the discharge pressure of the channels 10f always takes a higher level than that of the channels 10c. As a result, the pressure in the pressurized chamber D is higher than that in the upper thrust bearing chamber F.

As a result, the embodiment of FIG. 4 can also be given the lifting action of the thrust disc 10B and the floating action of the rotary portions like the foregoing embodiment of FIG. 1.

Figure 5:
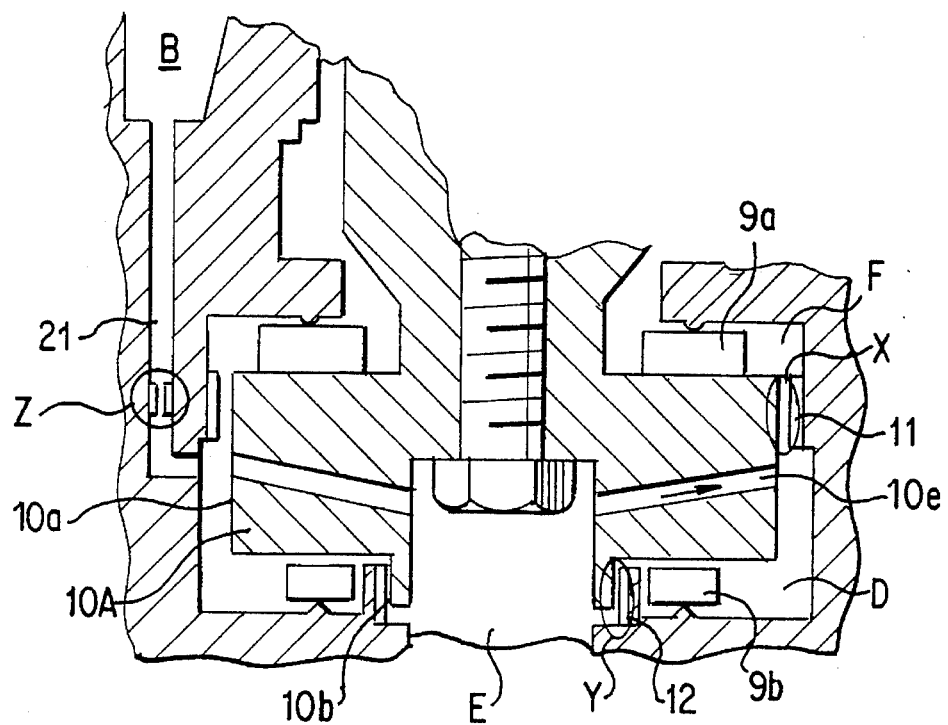
FIG. 5 is a schematic sectional view showing a thrust reducing device for a reactor internal pump according to a further embodiment of the present invention.

FIG. 5 is a sectional view showing a thrust reducing device for a reactor internal pump according to a further embodiment of the present invention. The description of the portions designated at the same reference numerals as those of FIG. 3 is omitted because they are equivalent to those of the foregoing embodiment.

The difference of the embodiment shown in FIG. 5 from the foregoing embodiment shown in FIG. 3 resides in that a passage 21 and an orifice Z are formed in the stationary side of the pressurized chamber D. The passage 21 provides communication between the pressurized chamber D and the motor chamber B.

When the reactor internal pump is operated, the fluid is thrown by the centrifugal force from the suction chamber E to the pressurized chamber D through the channel 10e formed in the thrust disc 10A. The fluid having its pressure thus boosted flows partly through the fixed orifice X into the upper thrust bearing chamber F and partly through the fixed orifice Y into the suction chamber E. The remaining part flows through the passage 21 and the orifice Z into the motor chamber B. The operations downstream of the upper thrust bearing chamber R are identical to those of the foregoing Embodiment 1. Moreover, the lifting action of the thrust disc 10a and the floating action of the rotary portions are also identical to those of the foregoing embodiment of FIG. 1.

Figure 6:
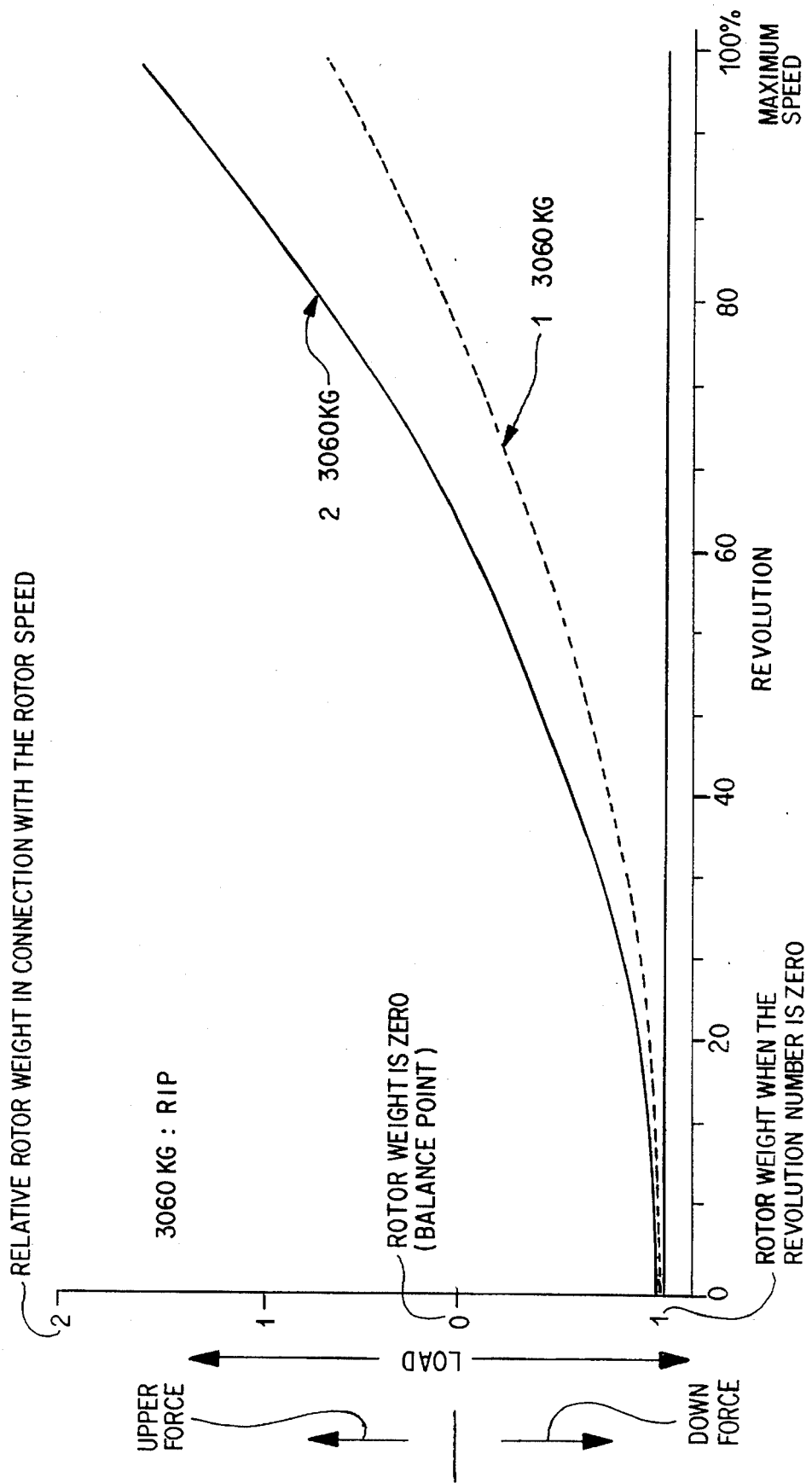
FIG. 6 is a diagram showing the relationship between comparative thrust loads and pump rotational speeds.

In FIG. 6, curve 1 is for a 3060 Kg assembly, including flywheel, but without chamber D pressure increasing measures, and curve 2 is for a 3060 Kg assembly, including flywheel and with Chamber D pressure increasing measures.

As has been described in detail hereinbefore, according to the present invention, it is possible to provide a reactor internal pump which can lighten the load to be borne by the lower thrust bearing at the pump running time without any complicated peripheral device, to elongate the lifetime of the thrust bearings.

What is claimed is:

1. An internal pump for a nuclear reactor, comprising:

a pump unit disposed in a nuclear reactor pressure vessel, said pump unit including an axially extending pump shaft drivingly connected to a pump impeller, and a motor unit disposed in a motor casing joined to the pressure vessel and having a motor shaft coaxial with and connected to the pumpshaft, said motor unit including:

a motor rotably driving the motor shaft, a flywheel fixed to the motor shaft at one axial side of the motor, a thrust disc fixed to the motor shaft at an axial side of the motor opposite the one axial side, said thrust disc serving as an auxiliary impeller, said thrust disc exhibiting a plurality of coaxial cylinder portions of different diameters including a bulging cylinder portion of large diameter and a constricted cylinder portion of smaller diameter than said bulging cylinder portion, a large ring housing section surrounding the bulging cylinder portion with a first fixed orifice formed between the bulging cylinder portion and the large ring housing section, and a small ring housing section surrounding the constricted cylinder portion with a second fixed orifice formed between the constricted cylinder portion and the small ring housing section, said ring housing sections and cylinder portions defining a pressurized chamber between the first and second fixed orifices.

2. An internal pump according to claim 1, wherein said pressurized chamber is formed below the bulging cylinder portion of said thrust disc.

3. An internal pump according to claim 1, wherein said thrust disc further has cooling water circulating channel for circulating motor cooling water and pressure boosting channels for boosting pressure in said pressurized chamber, and wherein said pressurized chamber pressure boosting channels have their suction ports positioned at a discharge side of said motor cooling water circulating channels.

4. A reactor internal pump according to claim 1 wherein said thrust disc further has channels having discharge ports directed toward said pressurized chamber for boosting the pressure in said pressurized chamber, so that the pressure-boosted liquid may be fed as motor cooling circulating water into a motor chamber through the first fixed orifice.

5. A reactor internal pump according to claim 1, wherein said thrust disc further has first channels for circulating motor cooling water and for boosting the pressure in said pressurized chamber, and wherein said pressurized chamber pressure boosting channels have suction ports positioned at a suction side of said motor cooling water circulating channels.

6. A reactor internal pump according to claim 1, wherein said thrust disc further has channels having discharge ports directed toward said pressurized chamber for boosting the pressure in said pressurized chamber, so that the pressure boosted liquid may be fed as motor cooling circulating water into a motor chamber through a passage formed at a stationary side of said pressured chamber.

* * * * *